Jan. 6, 1970  M. B. GOLDSTEIN  3,487,536
METHOD OF FORMING A HIGH TEMPERATURE CERAMIC-T-METAL SEAL
Original Filed July 2, 1962
FIG. 1
FIG. 2
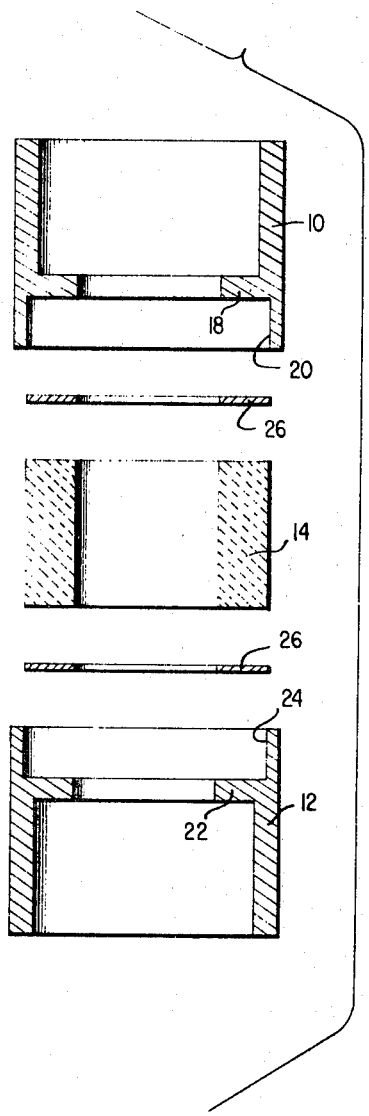
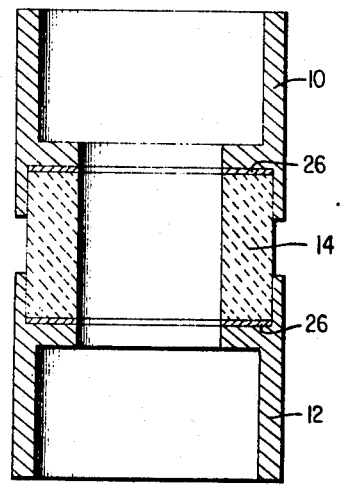
INVENTOR.
MARCY B. GOLDSTEIN
BY
*Sughrue, Rothwell, Mion, & Zinn*
ATTORNEYS.

United States Patent Office 3,487,536
Patented Jan. 6, 1970

3,487,536
METHOD OF FORMING A HIGH TEMPERATURE CERAMIC-TO-METAL SEAL
Marcy B. Goldstein, Phoenix, Ariz., assignor, by mesne assignments, to Teledyne, Inc., Los Angeles, Calif., a corporation of Delaware
Continuation of application Ser. No. 206,910, July 2, 1962. This application Feb. 24, 1966, Ser. No. 534,609
Int. Cl. B23k 31/02, 35/24
U.S. Cl. 29—473.1     9 Claims

ABSTRACT OF THE DISCLOSURE

A process for producing a high temperature seal between a first member formed of aluminum oxide or beryllium oxide and a second member formed of columbium, tantalum or alloys thereof. A brazing material of vanadium, vanadium-titanium, vanadium-palladium, vanadium-platinum or platinum is positioned btween the two aforesaid parts to be joined together and the assembly heated to cause a complete melting of the brazing material.

---

This is a continuation of my copending application Ser. No. 206,910 filed July 2, 1962, now abandoned. This invention relates to ceramic-to-metal seals, and more particularly to a seal of this type which is capable of maintaining vacuum-type conditions and providing electrical insulation while operating at extremely high temperatures.

Ceramic-to-metal assemblies find at least one particular application as members in thermionic conversion systems where it is essential that vacuum-type conditions prevail and that breakdown of the electrical insulation is prevented. However, the use of the seal and the method of forming the seal in the present invention is not intended to be limited to such a specific application but has universal application in devices with ceramic-to-metal junctions that are subjected to extremely high temperatures.

In the past, seals manufactured by conventional techniques may perform in a vacuum at temperatures in the order of 700° C. for limited periods of time; however, the manufacturers of these seals have failed to guarantee extended operation at temperatures as low as 400° C. This represents a serious limitation in the design and performance of thermionic conversion systems where higher efficiencies are associated with higher operating temperatures.

Another important requirement of ceramic-to-metal seals is that they exhibit good thermal shock resistance to accommodate more extreme conditions which may occur during operation of a thermionic device. In the determination of the particular materials to be used as the ceramic and as the metal, it is important to utilize materials having thermal compatibility with reltaively close thermal expansion coefficients. In the particular application to which the ceramic-to-metal seal in the present invention is applied, there is the additional problem of cesium corrosion. The ability of the ceramic-to-metal seal to withstand cesium corrosion becomes an absolute necessity in this application.

It is, therefore, a primary object of this invention to provide an improved ceramic-to-metal seal which is capable of maintaining vacuum-type conditions and providing electrical insulation while operating at extremely high temperatures.

It is a further object of this invention to provide an improved, high temperature ceramic-to-metal seal for use in thermionic conversion systems with increased efficiency at operating temperatures previously unattainable.

It is a further object of this invention to provide an improved, high temperature ceramic-to-metal seal for use in thermionic conversion systems capable of withstanding cesium corrosion inherent in such applications.

It is a further object of this invention to provide an improved, high temperature ceramic-to-metal seal having increased thermal shock resistance.

Further objects of this invnetion will be pointed out in the following detailed description and claims and illustrated in the accompanying drawing which discloses, by way of example, the principle of this invention and the best mode which has been contemplated of applying that principle.

In the drawing:

FIG. 1 is an exploded, sectional, side elevational view of the elements forming the improved, high temperature ceramic-to-metal-seal of the present invention.

FIG. 2 is a side elevational view, in section, of a completed ceramic-to-metal seal.

In general, the present invention is directed to a ceramic-to-metal seal in which the seal is formed by successively assembling a ceramic consisting of one material of a group including aluminum oxide and beryllium oxide, a brazing material consisting of one of a group including vanadium, vanadium-titanium, vanadium-palladium, vanadium-platinum and platinum, and a metal consisting of one material of a group including pure columbium, an alloy of columbium, pure tantalum and an alloy of tantalum. The assembly is subjected to a vacuum and is simultaneously heated slowly to a temperature in the order of 1350° C. and then rapidly to a temperature in the order of 1900° C., whereby the brazing material melts and fuzes the ceramic to the metal to effect a leak-proof seal which is capable of sustained use at extremely high temperatures.

Referring to the drawing, there is shown in FIG. 1, an exploded view, in section, of the components forming the improved high temperature ceramic-to-metal seal of the present invention. A pair of cylindrical, metal retainer caps 10 and 12 are coaxially positioned to be coupled in sealed relation to a centrally located cylindrical ceramic body 14. The retainer caps 10–12 are, in the preferred embodiment, formed of unalloyed columbium. The ceramic body 14 is, in the preferred embodiment, formed of impervious, high purity alumina ($Al_2O_3$) (96–97%).

The unalloyed columbium retainer caps 10 and 12 are machined to form a receiving pocket including flanges 18 and bore 20 within element 10 and flange 22 and bore 24 within retainer cap 12. The retainer caps 10 and 12 are machined as indicated to fit around the ceramic to dimensional tolerances of + or −.005 inch. The portion of the columbium retainer cap adjacent bores 20 and 24, respectively, should have a wall thickness sufficiently thin to reduce mechanical stress on the ceramic member during the subsequent performance of the seal. A wall thickness of 5 to 20 mils is normally satisfactory for most seal sizes.

In order to effect a chemical bond between the ceramic 14, which may include metallizing at the seal areas, and the associated retainer caps 10 and 12 capable of maintaining vacuum-type conditions and providing electrical insulation while operating at extremely high temperatures in the order of 1200° C. or above, both within vacuum or inert atmospheres, the method of the present invention makes use of a brazing material which in the embodiment shown in the drawing comprises a relatively thin ring or washer 26 having an exterior diameter generally equal to the diameter of the bores 20 and 24, respectively. The brazing ring 26 is fabricated from a high-purity vanadium sheet metal in a preferred embodiment having a purity of 99.9%. A thickness of 5 mils is satisfactory for most applications.

The brazing is accomplished by jigging together all of the components in the manner indicated by the finished product shown in FIG. 2 of the drawing. The assembled components are subjected to a high vacuum and to a temperature at which the two vanadium washers 26 at either end of the assembly completely melt and effect a vacuum-type bond. In one example, the temperature of the assembly was gradually raised to 1350° C., and then rapidly raised to the melting point of vanadium, about 1900° C., with no hold time. The rapid heating from 1350° C. to approximately 1900° C. was accomplished in a time period of 25 seconds. At the temperature of 1900° C., the heat input was immediately discontinued. Precautions should be taken to avoid overshooting the final brazing temperature since at this temperature, the preferred ceramic member, a 97% alumina body, would normally be expected to undergo deformation. It is only the abbreviated preiod of time at temperature that prevents this from occurring. Hence, time at temperature as well as final temperature are the critical elements that comprise the satisfactory formation of the vanadium-brazed seal.

The seal of this invention exhibits one major advantage over previously existing seals; namely, it can perform successively at temperatures at least as high as 1200° C., while known commercially available seals are only capable of low temperature operation in the neighborhood of 700° C. for extended periods of time. This advantage becomes increasingly important when the ceramic-to-metal seal is used in thermionic conversion systems where higher efficiencies are associated with higher operating temperatures.

The limit of use of the ceramic-to-metal seal of the present invention seems to lie in the upper working limit of the ceramic component. Use in temperatures as high as 1500° C. is envisioned for seals manufactured by the method of the present invention.

In general, there are several advantages of the present seal as compared to other seal types. The completed seal has both a ductile metal member and a ductile braze. Therefore, stresses normally developed on the ceramic during the brazing operation are in a more relieved state due to the "give" of the metal member and the braze. For the same reason, the seal is capable of withstanding much more severe thermal shocking during operation of the module. In one test performed on a completed ceramic-to-metal seal manufactured by the method of the present invention, the seal was subjected to a thermal shock test consisting of a 50-cycle 600° C., and 10-cycle 1000° C. heat application. No noticeable effect on the seal resulted.

Vanadium-brazed seals have exhibited infinite electrical resistance across the ceramic member. Of primary importance is the fact that vanadium-brazed seals offer ultra-high temperature application. Where other seal types are limited ot 700° C. or at most 900° C. operation, the vanadium-brazed seal, through the selection of only high temperature components, may be capable of operating in a vacuum up to the maximum working temperatures of the ceramic; that is, approximately 1500° C. for the case of alumina.

If necessary, the ceramic body may be metallized. The metallizing of the ceramic may be accomplished by several techniques. One technique involves applying a lithium hydroxide-ammonium-molybdate solution to the ceramic by painting and then chemically bonding the layer to the surface of the ceramic by heating in a hydrogen or hydrogen-nitrogen atmosphere at 1200° C. for a period of time in the order of 3 minutes. If necessary, this operation may be repeated to insure bonding during the subsequent brazing operation. The thin metal layer aids in the subsequent bond between the ceramic and the brazing material. Any conventional technique may be employed for this added, but not necessary, step, the Telefunken process and its variations being other examples.

While the above discussion has been directed to a preferred embodiment in which the ceramic is formed of a body of imprevious, high-purity alumina, the retainer caps formed of unalloyed columbium, and the brazing material fabricated from a high-purity vanadium sheet metal, some substitutions may be made for these materials without departing from the scope of the present invention. The substitution of beryllium oxide for the aluminum oxide or alumina may be beneficial in some cases. Although beryllium oxide does not match the expansion characteristics of columbium as closely as aluminum oxide does, and the compressive strength of beryllium oxide is not as high as aluminum oxide, there are certain properties, such as a higher melting point, a higher thermal conductivity, and a higher electrical resistivity that makes the use of beryllium oxide very attractive. The higher melting point of beryllium oxide, 2550° C. as compared to 2090° C. for aluminum oxide, will act to simplify the brazing operation and to increase the ultimate operating temperature of the vanadium-brazed seal. The higher thermal conductivity of the beryllium oxide will result in a seal combination that exhibits even better thermal shock resistance than that provided by alumina. Since the beryllium oxide exhibits higher electrical resistivity than aluminum oxide at high temperatures, a ceramic-to-metal seal with improved electrical insulation properties will result.

In addition to the use of unalloyed columbium for forming the metal portion of the ceramic-to-metal seal, alloys of columbium, tantalum, and alloys of tantalum may be used in forming the metal retainer caps.

Vanadium alloys, such as vanadium-titanium, vanadium-platinum, and vanadium-palladium, may be used as the brazing filler material, in the manufacture of the brazing washers, a variance of .002 inch to .008 inch thickness is generally acceptable although in no way should this be construed as being all-inclusive and limiting. Moreover, if other brazing forms, such as wires or sheet, are more applicable towards the construction of a particular configuration embodying this invention, they are considered to fall within the scope of this invention. Where the metallizing step is used in conjunction with the ceramic surface, the particular method described in the preferred embodiment may be used or other conventional molybdenum techniques may be employed. In the place of moly-metallizing, $TiH_2$ may be employed wherein the metallizing and brazing are best accomplished in one heating operation. Insofar as the manufacture of the columbium retainer cap is concerned, the manufacturing step described as "machining" may broadly include such techniques as deep-forming or related operations in which the caps are formed of sheet metal, due to the ductility of the columbium, resulting in a considerable reduction in the cost of producing a seal over that normally employed by conventional machining operations involving boring, etc.

The substitution of beryllium oxide for aluminum oxide will allow for considerably more latitude in the brazing temperature and brazing time. This, of course, is due to the correspondingly higher melting point of BeO. By the same token, the substitution of slightly lower melting point brazing alloys for vanadium, using alumina as the ceramic, will have the same effect.

While the fundamental novel features of the invention are shown as applied in a preferred method to effect a preferred structure, namely, an "outside" or compression seal design, shown in the drawing, it will be understood that various omissions and substitutions and changes in the form and detail of the device illustrated and in its method of manufacture may be made by those skilled in the art without departing from the spirit of the invention. This is to imply that other seal designs, such as the "inside" seal or butt seal, also fall within the spirit of this invention. It is the intention, therefore, to be limited only as indicated by the scope of the following claims.

What is claimed is:

1. A method of forming a high temperature ceramic-to-metal seal comprising the steps of successively assembling a ceramic element formed of aluminum oxide, a vanadium brazing material, and a columbium metal element, subjecting said assembly to a vacuum and concurrently heating said assembly rapidly to a temperature in the order of 1900° C. and discontinuing the application of heat at this temperature.

2. A method of forming a high temperature ceramic-to-metal seal comprising the steps of; successively assembling a ceramic element of one material of a group consisting of aluminum oxide and beryllium oxide, a brazing material of one material of a group consisting of vanadium, vanadium-titanium, and vanadium-palladium and a metal element of one material of a group consisting of pure columbium, an alloy of columbium, pure tantalum, and an alloy of tantalum, subjecting said assembly to a high vacuum and concurrently, first heating said assembly slowly to a temperature in the order of 1350° C., and then rapidly to a temperature in the order of 1880° C., and discontinuing the application of heat at said higher temperature.

3. A method of forming a high temperature ceramic-to-metal seal comprising the steps of; successively assembling: a ceramic element of one material of a group consisting of aluminum oxide and beryllium oxide, a brazing material of one material of a group consisting of vanadium-titanium, and vanadium-palladium, and a metal element of one material of a group consisting of pure columbium, an alloy of columbium, tantalum, and an alloy of tantalum, subjecting said assembly to a high vacuum, and concurrently, first heating said assembly slowly to a temperature in the order of 1350° C., and then rapidly to a temperature just sufficient to cause complete melting of the brazing material, and discontinuing the application of heat at this temperature.

4. A method of forming a high temperature ceramic-to-metal seal comprising the steps of; successively assembling: a ceramic formed of 97% $Al_2O_3$, a brazing material consisting of pure vanadium, and a metal comprising unalloyed columbium, subjecting said assembly to a high vacuum, slowly heating said assembly in said vacuum to a temperature of 1350° C., and then rapidly heating said assembly in said vacuum to approximately 1900° C. in approximately 25 seconds, and discontinuing the application of heat at the higher temperature.

5. A method of forming a high temperature ceramic-to-metal seal comprising the steps of metallizing an aluminum oxide ceramic element by applying a lithium hydroxide-ammonium molybdate solution and chemically bonding this coating to the ceramic by heating in a hydrogen atmosphere at 1200° C. for a period of time in the order of 3 minutes, successively assembling the coated aluminum oxide ceramic element, a vanadium brazing material, and a columbium metal element, subjecting said assembly to a high vacuum and concurrently, first heating said assembly slowly to a temperature in the order of 1350° C., and then rapidly to a temperature in the order of 1900° C., and discontinuing the application of heat at the higher temperature.

6. A method of forming a high temperature ceramic-to-metal seal comprising the steps of metallizing an aluminum oxide ceramic element by applying a lithium hydroxide-ammonium molybdate solution and chemically bonding this coating to the ceramic by heating in a hydrogen-nitrogen atmosphere at 1200° C. for a period of time in the order of 3 minutes, successively assembling the coated aluminum oxide ceramic element, a vanadium brazing material, and a columbium metal element, subjecting said assembly to a high vacuum and concurrently, first heating said assembly slowly to a temperature in the order of 1350° C., and then rapidly to a temperature in the order of 1900 C., and discontinuing the application of heat at the higher temperature.

7. A method of forming a high temperature ceramic-to-metal seal comprising the steps of:
   (a) Successively assembling a ceramic element formed of one material of a group consisting of aluminum oxide and beryllium oxide; a brazing material selected from a group consisting of vanadium, vanadium-titanium, vanadium-palladium, vanadium-platinum and platinum; and a metal element selected from a group consisting of columbium, an alloy of columbium, tantalum and an alloy of tantalum; and
   (b) Heating said assembly in a vacuum sufficiently to cause a complete melting of said brazing material.

8. The method of claim 7 including additionally the step of metallizing the seal area of said ceramic element with a thin layer of molybdenum prior to said assembly step.

9. The method of claim 7 including additionally the step of metallizing the seal area of said ceramic element with a thin layer of titanium.

References Cited

UNITED STATES PATENTS

| | | | |
|---|---|---|---|
| 2,504,522 | 4/1950 | Greiner | 287—189.365 X |
| 2,686,958 | 8/1954 | Eber | 29—473.1 |
| 2,698,913 | 1/1955 | Espersen. | |
| 2,719,797 | 10/1955 | Rosenblatt | 117—65 |
| 2,776,472 | 1/1957 | Mesick | 29—492 X |
| 2,985,747 | 5/1961 | Kutchera | 219—118 X |
| 3,046,650 | 7/1962 | Heestand | 29—494 X |
| 3,057,445 | 10/1962 | Bronnes | 287—189.365 |
| 3,088,201 | 5/1963 | Louden | 29—504 X |
| 3,106,773 | 10/1963 | Jaffe | 29—501 X |
| 3,197,290 | 7/1965 | Williams | 29—195 |

FOREIGN PATENTS 610,372  12/1960  Canada.

JOHN F. CAMPBELL, Primary Examiner

R. F. DROPKIN, Assistant Examiner

U.S. Cl. X.R.

29—195, 198, 492, 494, 498, 501, 504; 287—189, 365